(12) United States Patent
Wilms et al.

(10) Patent No.: US 6,202,993 B1
(45) Date of Patent: Mar. 20, 2001

(54) SELF-PUMPING HYDROPNEUMATIC SHOCK STRUT WITH INTERNAL LEVEL REGULATION

(75) Inventors: Bernd Wilms, Hennef; Holger Kirchner, Ruppichteroth; Achim Meier, Siegburg, all of (DE)

(73) Assignee: Mannesmann Sachs AG, Eitorf (DE)

( * ) Notice: Subject to any disclaimer, the term of this patent is extended or adjusted under 35 U.S.C. 154(b) by 0 days.

(21) Appl. No.: 09/216,644

(22) Filed: Dec. 18, 1998

(30) Foreign Application Priority Data

Dec. 18, 1997 (DE) .............................................. 197 56 472

(51) Int. Cl.$^7$ ....................................................... E16M 1/00
(52) U.S. Cl. .............................................................. 267/136
(58) Field of Search .................................. 267/136, 69.15, 267/64.7, 64.28, 140.11, 140.13, 195, 217; 188/297, 313, 314, 315; 137/528, 529, 535, 540

(56) References Cited

U.S. PATENT DOCUMENTS 4,577,840 * 3/1986 Meller ................................. 267/64.17
5,564,680 * 10/1996 Sano ................................... 267/69.17

* cited by examiner

*Primary Examiner*—Robert J. Oberleitner
*Assistant Examiner*—C. T. Bartz
(74) *Attorney, Agent, or Firm*—Cohen, Pontani, Lieberman & Pavane

(57) ABSTRACT

Self-pumping hydropneumatic shock strut with internal level regulation for motor vehicles with a work cylinder which is filled with oil and acted upon by pressure by at least one gas cushion arranged in a high-pressure chamber which acts as a spring. The work cylinder is divided into two work spaces by a work piston carried by a hollow piston rod. The work piston has a piston pump which is driven by the spring movements and delivers oil from a low-pressure chamber in the work space connected with the high-pressure chamber. The pump cylinder of the piston pump is formed by the hollow piston rod. A hollow pump rod which is fastened to the work cylinder and carries a suction valve at its front end penetrates into the piston rod and the bore of the hollow pump rod is connected with the low-pressure chamber. A regulating opening of the pump rod is closable as a function of the position of the work piston in the work cylinder and connects the work space connected with the high-pressure chamber with a regulating channel having a choke and opening into the low-pressure chamber. The piston pump is provided with an overload valve in which the suction valve is incorporated.

6 Claims, 2 Drawing Sheets

SELF-PUMPING HYDROPNEUMATIC SHOCK STRUT WITH INTERNAL LEVEL REGULATION

BACKGROUND OF THE INVENTION

1. Field of the Invention

The invention relates to a self-pumping hydropneumatic spring strut or shock strut with internal level regulation for use with motor vehicles. The shock strut includes a working cylinder which is filled with oil and acted upon with pressure from at least one gas cushion arranged in a high-pressure chamber and acting as a spring. The work cylinder is divided into two work spaces by a work piston having a hollow piston rod and a piston pump which is driven by the spring movements. One of the work spaces is connected to the high-pressure chamber. The piston pump has a pump cylinder formed by the hollow piston rod and delivers oil from a low-pressure chamber to the work space connected with the high-pressure chamber. A hollow pump rod which is fastened to the work cylinder and has a suction valve at its front end penetrates into the hollow piston rod. The bore of the hollow pump rod is connected with the low-pressure chamber. The hollow pump rod also has a regulating opening which is closable as a function of the position of the piston rod in the working cylinder and which connects the work space connected with the high-pressure chamber with the bore of the hollow pump rod.

2. Description of the Related Art

In shock struts of the type mentioned above which are already known, for example, from DE-PS 33 06 393, the work cylinder is divided into two work spaces by a work piston carried by a hollow piston rod and a pump cylinder is formed by the hollow piston rod. A pump rod penetrates into this pump cylinder to form a piston pump. The hydraulic piston pump is constantly in operation during driving operation, so that movements of the vehicle axle and of the piston rod fastened thereto which are brought about by uneven roadways constantly deliver oil to the working cylinder. The piston rod is displaced outward until a regulating opening of the pump rod releases a connection between the work cylinder acted upon by high pressure and the low-pressure space. In this position, the piston pump which continues active does not cause any further outward movement of the piston rod relative to the work cylinder. A disadvantage of this invention is that a pressure compensation takes place between the high pressure and the low pressure space when the regulating opening is released, so that the piston rod dips back into the work cylinder. Therefore, the height or level of the vehicle must then be achieved anew by means of the piston pump.

SUMMARY OF THE INVENTION

It is the object of the invention to provide a simple, reliable functioning and sensitive level regulation device in which any overpressure that might occur does not lead directly to regulation of the shock strut.

This object is met according to the invention in that the piston pump is provided with a relief or overload valve.

The advantage herein consists in that a maximum operating pressure cannot be exceeded, so that overloading of the vehicle will not lead to a failure of the level regulation system.

The pressure increase is already prevented at the pump, so that the volume flows to be managed by the overload valve are small in contrast to overload valves which let out directly from the high-pressure space into the low-pressure space. In these overload valves between high-pressure space and low-pressure space, the piston rod volume must be displaced, whereas in the described overload valves of the invention, only the pump rod volume must be displaced.

In one arrangement of the present invention, the overload valve is formed of a valve seat and a spring-loaded adapter. According to another feature, the adapter of the overload valve is simultaneously constructed as a valve seat for the suction valve.

It is further provided that the end face of the adapter cooperates with a stationary stop arranged at the pump rod and that a bore arranged in the adapter forms the valve seat for a valve body of the suction valve.

In one embodiment, a spring, an adapter, a valve body and an additional spring are arranged axially in succession in a stepped bore of the pump rod proceeding from the bore step and are held by a closure part having an opening to the pump space for forming both a suction valve and an overload valve.

In an essential feature, the closure part is held relative to the pump rod in a positive and/or frictional engagement.

The closure part may also be constructed integral with the adapter. Operation is carried out in such a way that oil is drawn in from the low pressure chamber when the pump begins to operate. After a determined pressure difference between high pressure (pump pressure space) and low pressure space, the drawn in oil is pushed back through the opening overload valve into the pump space. The opening pressure can be freely selected by the spring pretensioning.

In this construction, the valve is not pressed against a stationary wall in the stepped bore, but rather is held in a floating or suspended manner by a spring. This version is pretensioned in a force-dependent manner and is then fastened in the stepped bore by frictional or positive engagement.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
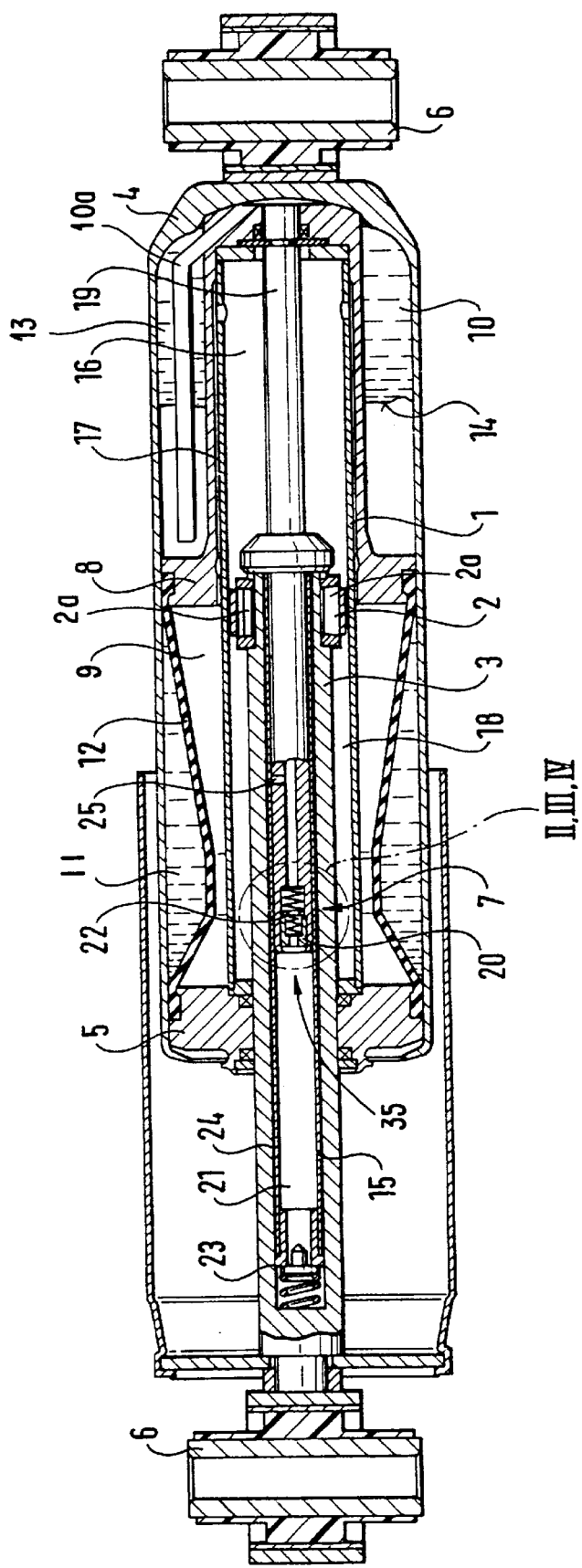
FIG. 1 shows a sectional view of a self-pumping hydropneumatic shock strut with internal level regulation according to an embodiment of the present invention.

FIG. 1 shows a level regulation device in a shock strut for use in a motor vehicle including a work cylinder 1 in which a piston 2 is slidably mounted at the end of a piston rod 3. The work cylinder 1 is closed on one side by a base 4 and on the other side by a cover 5. The cover 5 has a hole through which the piston rod 3 penetrates and which is sealed around the piston rod 3. The base 4 is fastenable to the body of the vehicle by a fastening element 6 and the piston rod 3 is fastenable to an axle of the vehicle in a manner not shown by a fastening lug at another fastening element 6. The work cylinder 1 is enclosed by an annular compensation chamber that is filled partly with oil and partly with gas and divided by an intermediate wall 8 into a high-pressure chamber 9, 11 and a low-pressure chamber 10. The high-pressure chamber 9, 11 is divided by a diaphragm 12 into an oil space 9 and a gas space 11. In the low pressure chamber 10, oil and a low-pressure gas cushion 13 are not separated from one another by a physical barrier. The oil level in the low pressure chamber 10 is indicated by oil level line 14. In the fully regulated state, that is, not in the pumped up state, the pressure in the low-pressure chamber 10 is equal to the pressure in the high-pressure chamber 11, 9. A first work space 16 in the working cylinder 1 between the work piston 2 and the base 4 communicates with the oil space of the high-pressure chamber 9, 11 via the channel 17. A second work space 18 in the working cylinder 1 between the work piston 2 and the cover 5 cooperates with the work space 16 of the work cylinder 1 at the front side via valves 2a of the work piston 2.

A piston pump 35 includes a pump rod 19 with a first end fastened to the base 4 and a second end slidably inserted within a hollow control pipe 15 in the piston rod 3. The control pipe defines a pump cylinder 21 in the hollow space of the piston rod 3 which forms an oil pump with the pump rod 19. The movements of the vehicle axle and of the piston rod 3 fastened thereto caused by unevenness in the roadway actuate this oil pump which constantly draws oil from the low-pressure chamber 10 through suction valve 22 of the piston pump 35 as the piston rod 3 is withdrawn from the work cylinder 1. As the work piston 2 and piston rod 3 with the control pipe 15 are displaced outward, the oil from the low pressure chamber 10 is drawn through the suction valve 22 via a connection 10a. When the work piston 2 and piston rod 3 are displaced back into the work cylinder 1, oil that has been drawn through the suction valve 22 is supplied from the pump cylinder 21 via a pressure valve 23 through a channel 24 which extends to the upper end of the control pipe 15 into the work cylinder 1. This slowly builds up the pressure in the working cylinder 1. A regulating opening 25 is arranged in the pump rod 19 so that when the work piston 2 and piston rod 3 have been displaced out of the work cylinder 1 to a position that is at or proximate a full extension, the regulating opening 25 is uncovered, thereby creating a connection between the hollow portion of the pump rod 19 (which is connected to the low-pressure chamber 10 as described above) and the work cylinder 1. The connection allows the pressures between the low pressure chamber 10 and the work cylinder 1 to equalize. After the work piston 2 and piston rod 3 are displaced back into the work cylinder 1 so that the regulating opening is covered, the process is repeated.

Figure 2:
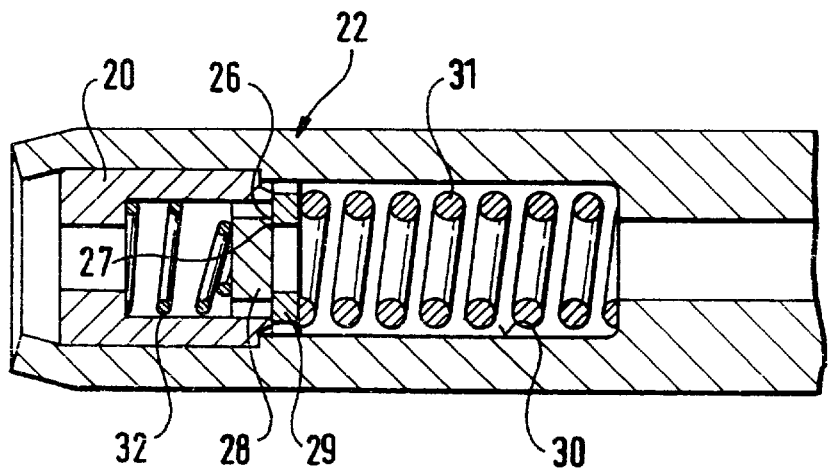
FIG. 2 shows an embodiment form of an overload valve in area II of the shock strut of FIG. 1.

FIG. 2 shows a detail of the second end of the pump rod 19 which is inserted in the piston rod 3. An adaptor 20 is fixedly arranged at or proximate the second end of the pump rod 19. A spring 31 is arranged in a stepped bore 30 of the pump rod 19 and is compressed between a bore step and the adapter 20. A valve seat element 29 having a valve seat 27 is arranged between the spring 31 and the adapter 20 so that the seat element 29 is urged against the adapter 20. Finally a valve body 28 is resiliently urged against valve seat 28 by a spring 32. The spring 32 and valve body comprise the suction valve 22 and spring 31 and valve seat element 29 comprise the overload valve 7. The overload valve 7 prevents a maximum operating pressure from being exceeded so that overloading of the vehicle does not lead to a failure of the level regulating system.

Figure 3:
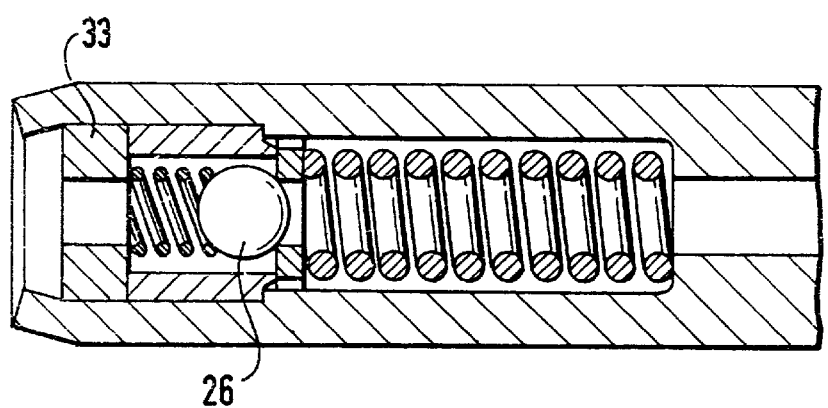
FIG. 3 shows another embodiment form of the overload valve shown in area III of FIG. 2.

FIG. 3 shows another embodiment form of the detail shown in FIG. 2 in which a bail 26 is used instead of the valve body 28. The adapter 20 in FIG. 3 is also separated from a closure part 33 which is fixedly built in the pump rod 19.

Figure 4:
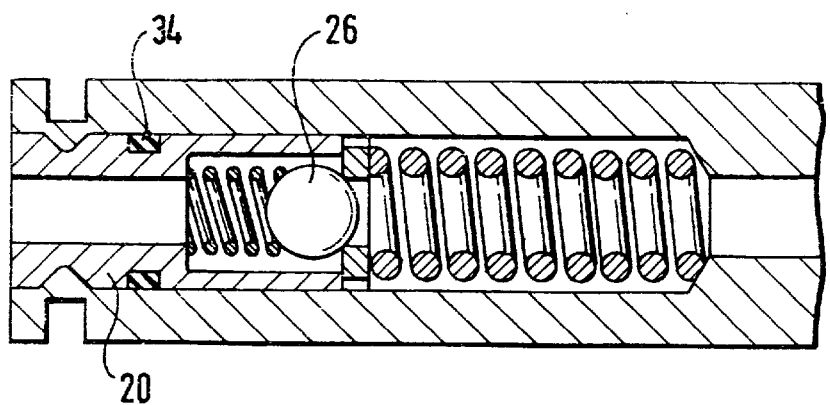
FIG. 4 shows yet another embodiment forms of the overload valve shown in area IV of FIG. 2.

FIG. 4 shows an embodiment form in which the adapter 20 and the closure part 33 have been combined to form a new adapter 20'. FIG. 4 shows a valve body 29 which is advantageously adjusted in a force-dependent manner and is held in a positive engagement in the pump rod 19. The force-dependent adjustment eliminates the tolerance requirement of the spring and accordingly improves the response range.

The invention is not limited by the embodiments described above which are presented as examples only but can be modified in various ways within the scope of protection defined by the appended patent claims.

We claim:

1. A self-pumping hydropneumatic shock strut with internal oil level regulation, comprising:

a high-pressure chamber and a low-pressure chamber arranged in said shock strut;

a work cylinder filled with oil;

a work piston connected at an end of a hollow piston rod and slidably inserted in said work cylinder for dividing said work cylinder into a first work space and a second work space, said first work space operatively connected with said high-pressure chamber;

a piston pump operatively connected in said piston rod for delivering oil from said low-pressure chamber into said first work space, said piston pump comprising a pump cylinder formed by said hollow piston rod and a hollow pump rod having a first end fixed relative to said work cylinder and a second end comprising a suction valve inserted into said hollow piston rod, said pump rod having a bore there through connected with said low-pressure chamber so that said suction valve draws oil from said low-pressure chamber when said piston rod moves out of said work cylinder;

a regulating opening arranged through said pump rod so as to be closable by said piston rod as a function of a position of said piston rod in said work cylinder; and an overload valve operatively arranged in said piston pump for allowing oil to flow from said pump cylinder back toward said low-pressure chamber during an overpressure condition in said piston pump.

2. The shock strut of claim 1, wherein said overload valve comprises a valve seat and a spring-loaded adapter fixedly arranged in said pump rod.

3. The shock strut of claim 2, wherein said adapter of said overload valve comprises a valve seat for said suction valve.

4. The shock strut of claim 3, wherein said adapter comprises an end face operatively arranged for cooperation with a stationary valve seat arranged at said pump rod, said suction valve comprises a valve body, and said adapter further comprises a bore forming a valve seat for said valve body of the suction valve.

5. The shock strut of claim 1, wherein said bore of said pump rod comprises a stepped bore arranged between a bore step and a closure part and said piston pump comprises a first spring, an adapter, a valve body and an additional spring arranged in axial succession in said stepped bore of said pump rod proceeding from the bore step and are held by said closure part having an opening to said pump cylinder.

6. The shock strut of claim 5, wherein said closure part is fixed to said pump rod via one of a positive engagement and a frictional engagement.

* * * * *